(12) United States Patent
Cipra

(10) Patent No.: US 7,064,908 B2
(45) Date of Patent: Jun. 20, 2006

(54) LASER BEAM JITTER REDUCTION DEVICE ON A LASER OPTICAL BENCH

(75) Inventor: Dale Owen Cipra, Chatsworth, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/830,466

(22) Filed: Apr. 21, 2004

(65) Prior Publication Data

US 2005/0237640 A1 Oct. 27, 2005

(51) Int. Cl.
*G02B 7/02* (2006.01)

(52) U.S. Cl. ............... 359/819; 359/822; 359/827; 372/107

(58) Field of Classification Search .......... 359/819, 359/822, 823, 827, 829, 871; 372/107, 34
See application file for complete search history.

(56) References Cited

U.S. PATENT DOCUMENTS

| | | | | |
|---|---|---|---|---|
| 4,274,064 A | 6/1981 | Sepp et al. | ............ | 372/107 |
| 4,319,836 A * | 3/1982 | Murata et al. | ............ | 355/55 |
| 4,365,335 A | 12/1982 | Lamboo | ............ | 372/34 |
| 4,432,601 A | 2/1984 | Mannschke | ............ | 126/60 |
| 4,705,257 A | 11/1987 | Leo et al. | ............ | 248/611 |
| 4,774,714 A | 9/1988 | Javan | ............ | 372/109 |
| 5,052,010 A | 9/1991 | Blumentritt et al. | ............ | 372/65 |
| 5,231,644 A | 7/1993 | Krueger et al. | ............ | 372/107 |
| 5,366,198 A | 11/1994 | Dickinson | ............ | 248/550 |
| 5,475,702 A | 12/1995 | August, Jr. et al. | ............ | 372/69 |
| 5,508,993 A * | 4/1996 | Hayashi et al. | ............ | 369/59.22 |
| 5,852,519 A * | 12/1998 | Do et al. | ............ | 359/822 |
| 5,999,346 A | 12/1999 | Grundstrom et al. | ............ | 359/822 |
| 6,081,544 A | 6/2000 | Zamel et al. | ............ | 372/107 |
| 6,109,574 A | 8/2000 | Pan et al. | ............ | 248/176.1 |
| 6,147,818 A * | 11/2000 | Hale et al. | ............ | 359/819 |
| 6,339,026 B1 * | 1/2002 | McTeer | ............ | 438/688 |
| 6,554,244 B1 * | 4/2003 | Remy De Graffenried et al. | ............ | 248/694 |
| 2001/0038498 A1 | 11/2001 | Furuhashi et al. | ............ | 359/819 |

FOREIGN PATENT DOCUMENTS

| | | |
|---|---|---|
| JP | 61199685 | 9/1986 |
| JP | 63241975 | 10/1988 |
| JP | 11281854 | 10/1999 |

* cited by examiner

*Primary Examiner*—Timothy Thompson
(74) *Attorney, Agent, or Firm*—MacPherson Kwok Chen & Heid LLP; Clifford G. Cousins

(57) ABSTRACT

In accordance with an embodiment of the present invention, a device including a first optical table, a second optical table, and at least one optical mount coupled to the first and second optical tables and configured to support at least one optical component. The first optical table is positioned on a first plane, while the second optical table is positioned on a second plane that is different from the first plane.

33 Claims, 5 Drawing Sheets

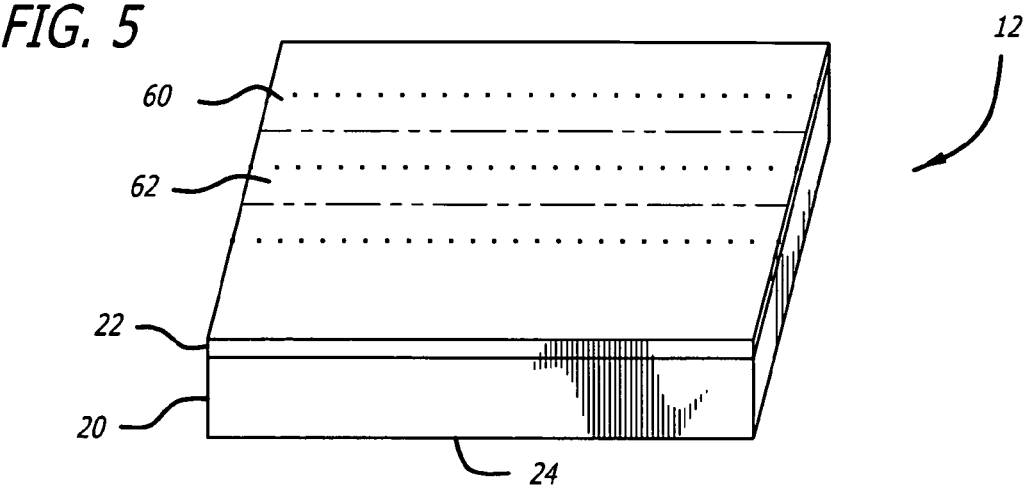
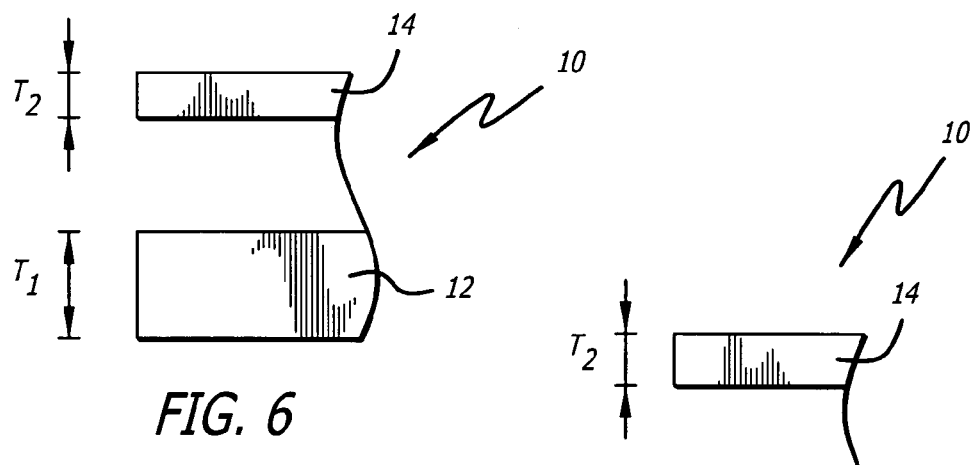
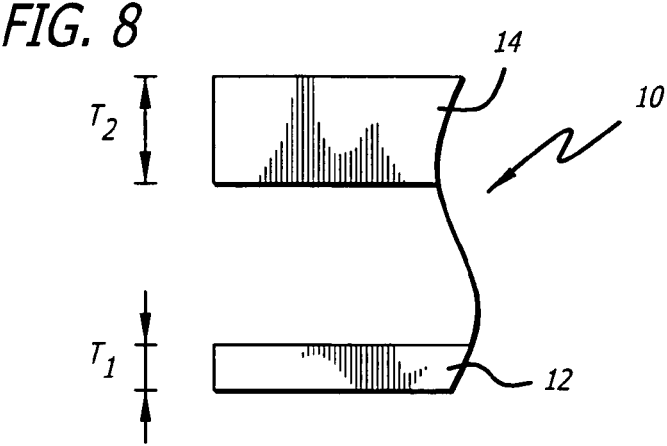

LASER BEAM JITTER REDUCTION DEVICE ON A LASER OPTICAL BENCH

BACKGROUND

During use, a signal traversing though an optical system is incident upon one or more optical components and/or analytical devices. Movement of a single optical component or analytical device within the optical system may adversely affect the quality of the optical signal traversing through the system. For example, movement of a lens may introduce noise, commonly referred to as jitter, or other aberrations into the optical signal. As such, optical components and analytical devices are typically positioned on or retained by optical mounts or fixtures configured to support the component and which are coupled to extremely rigid surfaces, typically referred to as an optical table.

Historically, optical tables were constructed of extremely dense materials. For example, slabs of granite have been used to manufacture optical tables. Typically, the granite slab includes one or more mounting holes sized to receive the optical mounts or mounting posts therein, thereby permitting the user to securely couple the optical mount supporting the components or analytical devices to the optical table. While these granite optical tables provided sufficient stability, flatness, and rigidity, a number of shortcomings have been identified. For example, the weight of the granite optical tables makes them cumbersome to use in a number of settings.

In response, a number of alternate optical tables have been developed which seek to overcome the shortcomings associated with granite tables. Generally, these designs incorporate a composite construction consisting of a relatively thin upper and lower surface or skin bonded to central honeycomb core. Typically, the upper surface of the honeycomb optical table is furnished with a regular array of threaded mounting holes to permit the secure attachment of optical mounts and related devices thereto. While these composite construction designs addressed a number of concerns associates with granite tables, various shortcoming associated with composite construction designs have been identified. For example, due the their lighter weight, composite construction optical table designs may be more susceptible to vibration than granite tables. In addition, both granite and composite construction optical tables support optical mounts and fixtures on a single plane. As such, the optical components or analytical devices coupled thereto may be capable of moving slightly when subjected to some environmental forces, such as acoustical waves. As such, jitter or other undesirable effects may be introduced into the optical signal traversing through an optical system attached to the optical table.

Thus, in light of the foregoing, there is an ongoing need for an optical table or bench system capable of supporting various optical components and/or analytical devices in a variety of environments.

BRIEF SUMMARY

The various embodiments of the laser beam jitter reduction devices disclosed herein enable a user to securely position an optical component within an optical system while reducing the effects of jitter and other environmental disturbances on the system.

In one embodiment, the present application discloses a laser beam jitter reduction device and includes a first optical table positioned on a first plane, a second optical table positioned on a second plane, the second plane differing from the first plane, and at least one optical mount coupled to the first and second optical tables and configured to support at least one optical component.

In another embodiment, the present application is directed to a laser beam jitter reduction device and includes a first optical table positioned on a first plane and having a first mounting surface positioned thereon, a second optical table positioned on a second plane differing from the first plane, the second optical table having a second mounting surface positioned proximate to the first mounting surface of the first optical table, and at least one optical mount coupled to the first and second mounting surfaces and configured to support at least one optical component thereon.

In addition, the present application further discloses an optical component mount for use with a laser beam reduction system and includes a first mount device having a first mount body extending from a first base configured to be coupled to a first optical table, the first mount body defining an first optic receiver orifice, a second mount device having a second mount body extending from a second base configured to be coupled to a second optical table, the second mount body defining an second optic receiver orifice, the second mount device configured to engage the first mount device to form an optical mount capable of supporting one or more optical components.

In still another embodiment, the present application is directed to an optical component mount system and includes a first mounting flange configured to couple to a first optical table, a second mounting flange configured to couple to a second optical table, a mount body positioned between and coupled to the first and second mounting flanges, and at least one optical component mount movably coupled to the mount body and configured to support at least one optical component thereon.

The present application further discloses a method of reducing the jitter of a laser beam within an optical system and includes positioning a first optical table on a first plane, positioning a second optical table on a second plane wherein the second plane differs from the first plane, securing a first portion of an optical component mount to the first optical table, securing a second portion of an optical component mount to the second optical table wherein the first and second portions of the optical mounts form an optical component mount system, and coupling at least one optical component to the optical component mount system.

Other objects, features, and advantages of the embodiments of the laser beam jitter reduction devices disclosed herein will become apparent from a consideration of the following detailed description.

BRIEF DESCRIPTION OF THE DRAWINGS

Various embodiments of the laser beam jitter reduction device of the present application will be explained in more detail by way of the accompanying drawings, wherein:

FIG. 5 shows a perspective view of an embodiment of an optical table for use with the laser beam jitter reduction device;

FIG. 6 shows a perspective view of an embodiment of a laser beam jitter reduction device wherein the first optical table has a thickness greater than the second optical table;

FIG. 7 shows a perspective view of an embodiment of an laser beam jitter reduction device wherein the thickness of the first optical table is approximately equal to the thickness of the second optical table;

FIG. 8 shows a perspective view of an embodiment of an laser beam jitter reduction device wherein the first optical table has a thickness less than the second optical table;

DETAILED DESCRIPTION

Figure 1:
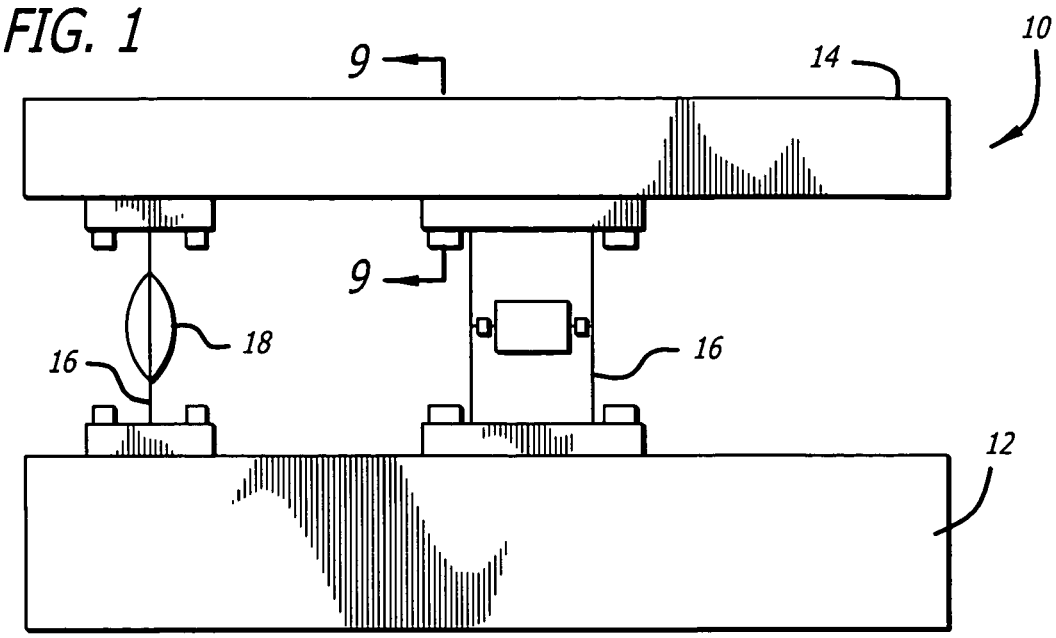
FIG. 1 shows a perspective view of an embodiment of a laser beam jitter reduction device.

FIG. 1 shows an embodiment of a laser beam jitter reduction device for a laser optical bench. As shown in FIG. 1, the laser beam jitter reduction device 10 includes a first optical bench 12, a second optical bench 14, and one or more optical mounts or fixtures 16 positioned therebetween and in communication therewith. As shown in FIG. 1, an optical component or analytical device 18 is positioned on or in communication with the optical mount 16. In the illustrated embodiment, two optical mounts 16 are positioned between the first and second optical benches 12, 14. Optionally, any number of optical mounts 16 may be used with the laser beam reduction device 10. The optical mounts or fixtures 16 may be configured to support any number or type of optical components or analytical devices between the first and second optical benches 12, 14. Exemplary optical components include, without limitation, lenses, mirrors, beam splitters, polarizers, shutters, spatial filters or modulators, lens systems, prisms, and/or corner cubes. Optionally, the optical mount 16 may be configured to support any number of analytical devices, including, without limitation, cameras, imaging devices, photometers, spectrum analyzers, power meters, or the like.

Figure 2:
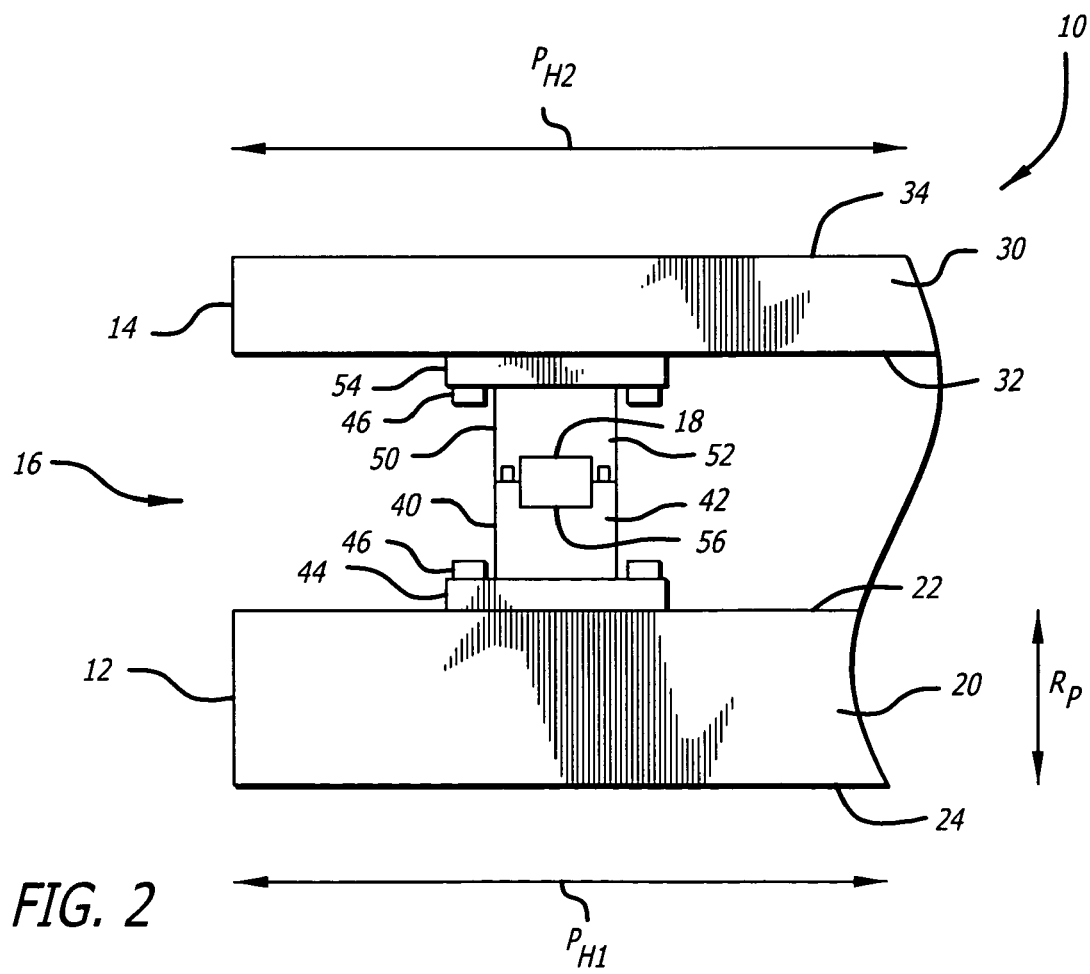
FIG. 2 shows a perspective view of an embodiment of a laser beam jitter reduction device system having an optical component mount positioned between a first and second optical table.

FIG. 2 shows a detailed view of an embodiment of a laser beam jitter reduction device 10. As shown, the first optical bench 12 includes a first body 20 positioned between a mounting surface 22 and a base 24. Similarly, the second optical bench 14 comprises a second body 30 positioned between a second mounting surface 32 and a second base 34. The optical mount 16 is positioned between and coupled to the first and second mounting surfaces 22, 32 of the first and second optical benches 12, 14. The optical mount 16 comprises a first mount device 40 having a first mount body 42 coupled to a first base 44. The first base 44 is coupled to the first optical bench 12 with one or more fasteners 46. Similarly, the optical mount 16 also includes a second mount device 50 comprising a second mount body 52 coupled to a second base 54. The second base 54 of the second mount device 50 is coupled to the second optical bench 14 with one or more fasteners 46. The first mount device 40 and second mount device 50 cooperatively form a component receiver 56 configured to receive at least one optical component or analytical device 18 therein. In the illustrated embodiment, the first optical bench 12 is positioned on the first plane $P_{H1}$. Similarly, the second optical bench 14 is positioned on a second plane $P_{H2}$, which is parallel to the first plane $P_{H1}$.

Figure 3:
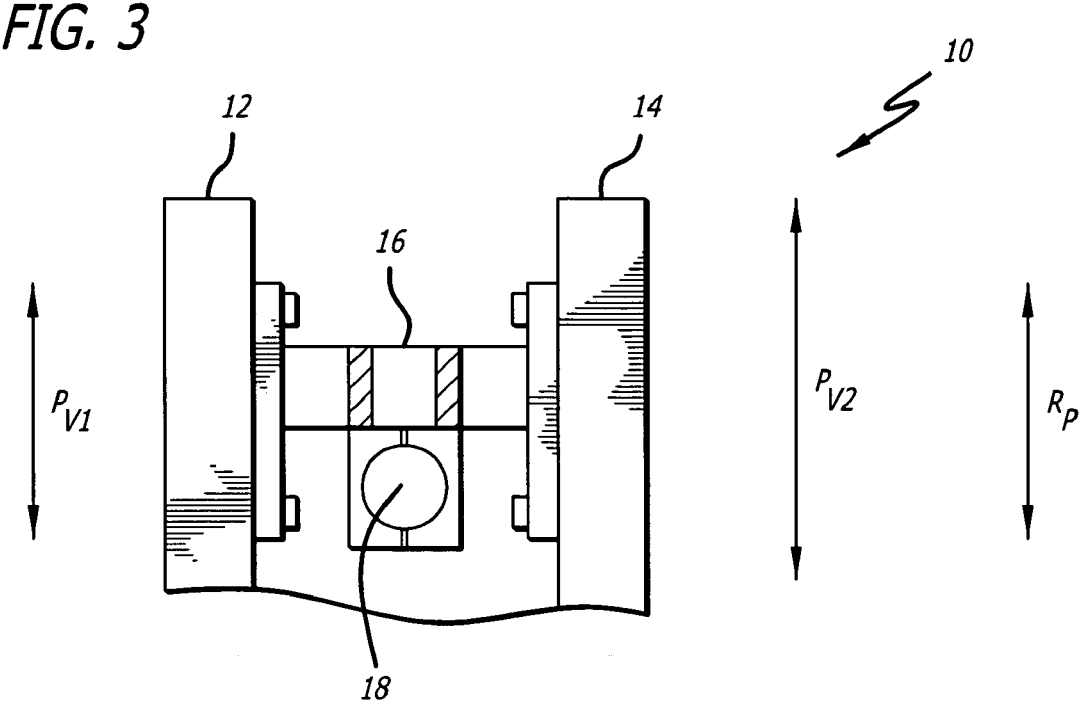
FIG. 3 shows a perspective view of another embodiment of a laser beam jitter reduction device system having an optical component mount positioned between a first and second optical table.
Figure 4:
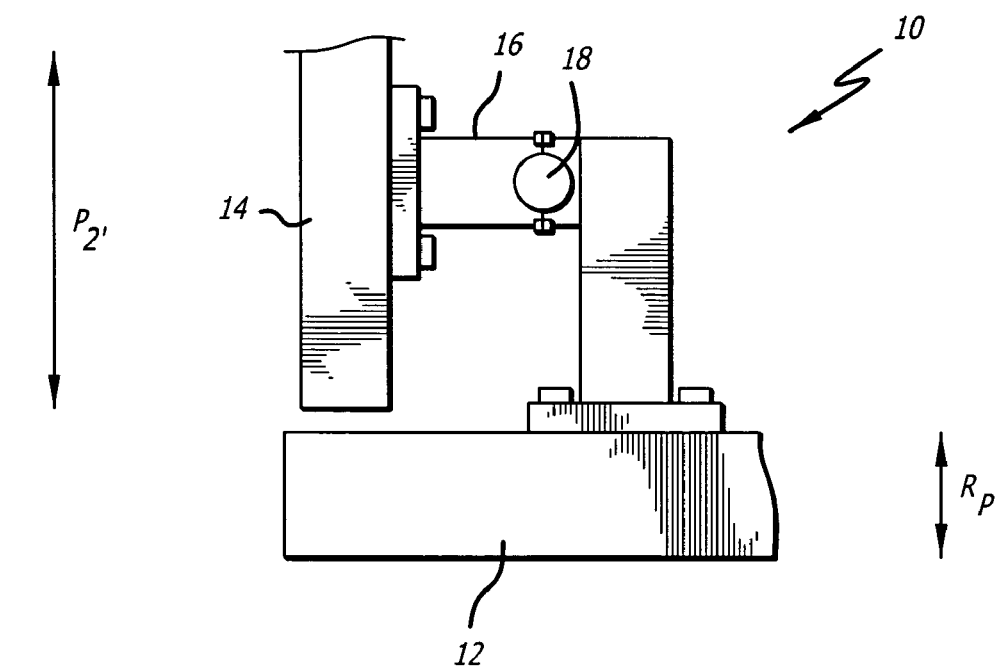
FIG. 4 shows a perspective view of another embodiment of a laser beam jitter reduction device system having an optical component mount coupled to a first and second optical table.

Referring again to FIG. 2, the laser beam jitter reduction device 10 may be configured to support the optical mount 16 horizontal to a reference plane $R_P$. FIG. 3 shows an alternate embodiment of the laser beam jitter reduction device 10. As shown, the first and second optical benches 12, 14 support the optical component 18 coupled to the optical mount 16 vertically with reference to the reference plane $R_P$. As shown, the first optical bench 12 is positioned along plane $P_{V1}$. Similarly, the second optical bench 14 is positioned along plane $P_{V2}$ which is parallel to plane $P_{V1}$. Optionally, the first optical bench 12, and the second optical bench 14 may be positioned along intersecting planes. FIG. 4 shows an embodiment of a first optical bench 12 positioned along a first plane $P_1'$ and a second optical bench 14 positioned along a second plane $P_2'$. As illustrated, plane $P_2'$ is orthogonal to plane $P_1'$.

Referring to FIGS. 1–4, the first optical bench 12 and the second optical bench 14 may be manufactured from any variety of materials in a plurality of manners. For example, the first optical bench 12 and/or the second optical bench 14 may be manufactured from a slab of one or more materials. Exemplary materials include, without limitation, granite, steel, aluminum, titanium, plastic, composite materials, foams, silicon, rubber, elastomers, or other materials generally used in the formation of optical tables. In an alternate embodiment, the first and second optical tables 12, 14 may be manufactured from a plurality of materials. FIG. 5 shows an embodiment of the first optical table 12 wherein the first body 20 is constructed of a first material and the mounting surface 22 is constructed from another material. For example, the first body 20 may be manufactured from a honeycombed composite material while the mounting surface 22 is manufactured from stainless steel. Optionally, any variety of materials may be combined to form the first optical bench 12, the second optical bench 14, and/or both. For example, the first optical bench 12 may be constructed of a slab of a first material while the second optical bench 14 may be manufactured utilizing a composite construction design of a second material. Referring again to FIG. 5, the mounting surface 22 may include one or more mounting holes or recesses 60 sized to receive a fastening device 46 therein. (See. FIG. 2) Optionally, the mounting surface 22 may include one or more tracks or rail devices 62 formed thereon thereby permitting optical components 16 to slide or otherwise move thereon along the mounting surface 22. In addition, the mounting surfaces 22, 32 of the first and second optical tables 12, 14 may be constructed of a material permitting one or more optical component mounts 16 to be magnetically coupled thereto.

Referring to FIG. 1, the first optical bench 12 and second optical bench 14 may be manufactured in a variety of lengths and thicknesses. FIG. 6 shows one embodiment of a laser beam jitter reduction device 10 wherein the first optical bench 12 has a first thickness $T_1$ and the second optical bench 14 has a second thickness $T_2$ wherein $T_2$ is less than $T_1$. FIG. 7 shows another embodiment of a laser beam jitter reduction device 10 wherein the first optical bench 12 has a first thickness $T_1$ which is substantially equal to the thickness $T_2$ of the second optical bench 14. Optionally, as shown in FIG. 8, the second optical bench 14 may have a second thickness $T_2$ which is greater than the thickness $T_1$ of the first optical bench 12.

Figure 9:
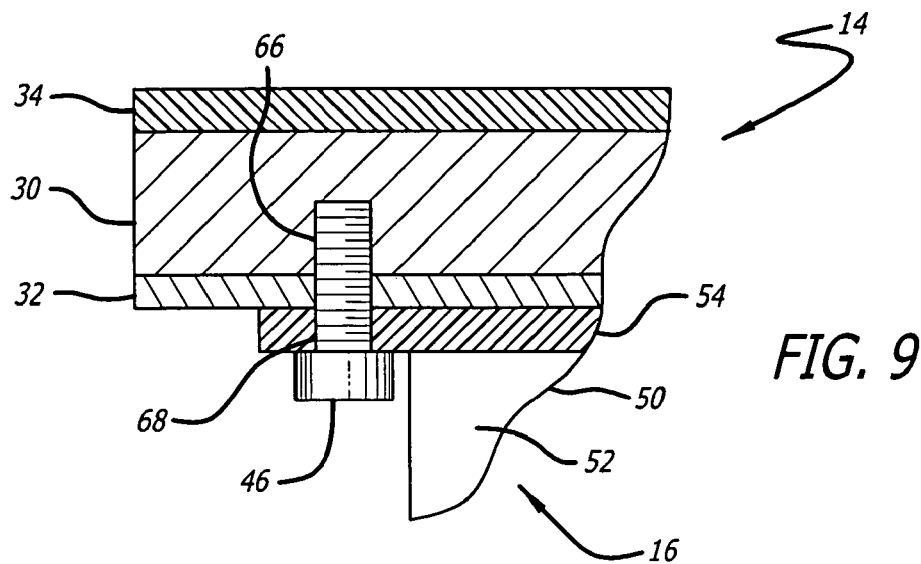
FIG. 9 shows a cross sectional view of an embodiment of a second optical component mount coupled to a second optical table as viewed along line 9—9 of FIG. 1.

FIG. 9 shows an embodiment of a fastening device 46 used for coupling an optical mount 16 to the second optical bench 14. As shown, the second optical bench 14 includes a body 30 positioned between a mounting surface 32 and a base 34. At least one mounting orifice or aperture 66 is formed within the mounting surface 32, the body 30, and/or the base 34. The mounting aperture 66 is sized to receive a fastening device 46 therein and may be threaded or include other fastening retention devices configured to engage the fastening device 46 and retain the fastening device 46 therein. The base 54 of the optical mount 16 may include at least one fastener passage 68 formed thereon which is configured to receive a fastening device 46 therethrough. As such, the user may couple the optical component 16 to the second optical bench 14 by inserting a fastening device 46 through the fastener passage 68 on the optical mount 16 and engaging the mounting surface 32, the body 30, and/or the base 34 of the second optical table 14. Optionally, the optical mount 16 may comprise a mounting post (not shown) having a threaded portion sized to engage and be retained the mounting aperture 66 formed on the second optical table 14. One or more optical mounts 16 may be coupled to the first optical table 12 in a similar manner as described above. Optionally, the base 54 of the optical mount 16 may include a magnet or magnetized material thereby permitting the optical mount 16 to be magnetically coupled to the first or second optical tables 12, 14.

Figure 10:
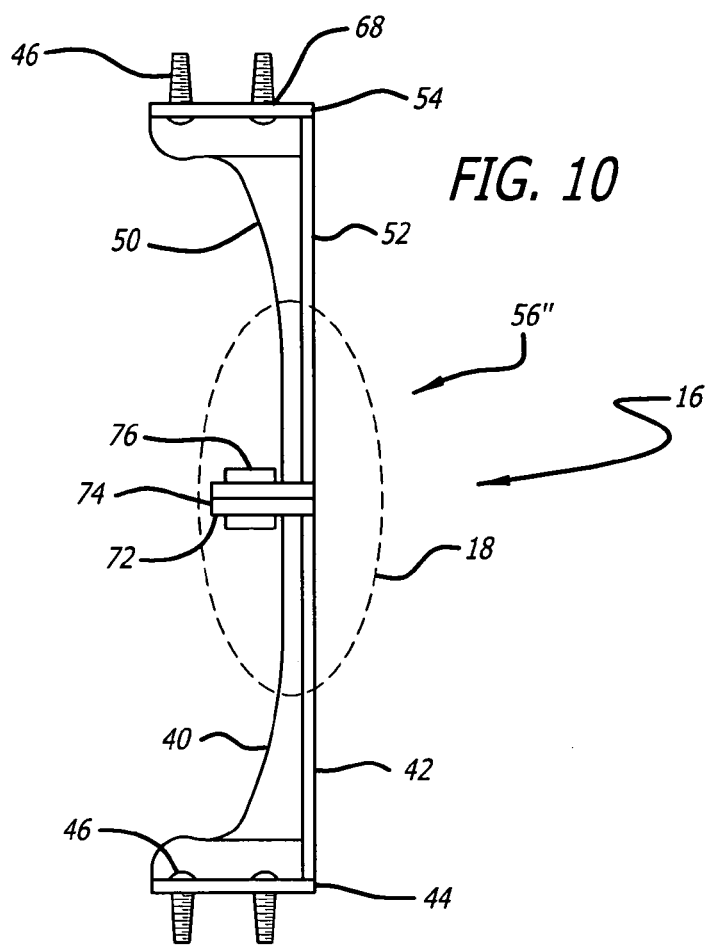
FIG. 10 shows a side view of an embodiment of an optical component mount system for use with an embodiment of a laser beam jitter reduction device.
Figure 11:
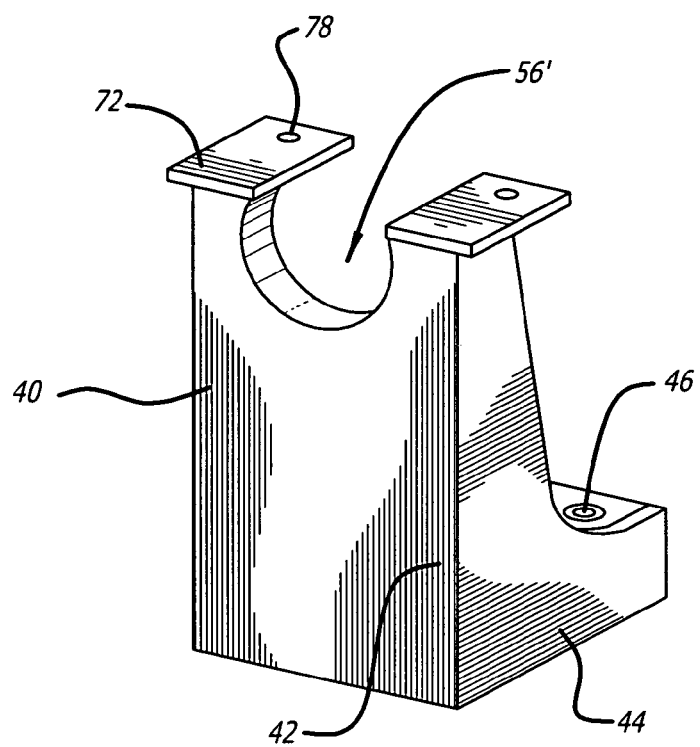
FIG. 11 shows a perspective view of a first optical mount portion of the optical component mount system shown in FIG. 10.

FIGS. 10 and 11 show an embodiment of an optical mount 16 which may be used with the laser beam jitter reduction device 10. As shown, the optical mount 16 includes a first mount device 40 coupled to or otherwise in communication with a second mount device 50. The first mount body 42 extends from the first mount base 44 and defines a portion of an optical component receiver 56'. Similarly, the second mount device 50 includes a second mount body 52 extending from a second mount base 54 and defines a component receiver 56". As such, an optical component receiver 56 is defined by the first and second mount devices 40, 50 and is sized to receive at least one optical component or analytical device 18 therein. As shown in FIG. 10, one or more fastener devices 46 may be positioned within fastener passages 68 formed on the first mount base 44 and the second mount base 54, thereby permitting the optical mount 16 to be coupled to the first and second optical tables 12, 14. As shown in FIGS. 10 and 11, the first mount device 40 includes a first coupling flange 72 positioned on or in communication with the first mount body 42 which defines at least one coupler receiver 78 thereon. Similarly, the second mount device 50 includes at least one second coupling flange 74 attached to or in communication with the second mount body 52 and defines a coupler receiver 78 therein. A coupler 76 may be positioned within and traverse through the coupler receivers 78 formed on the first and second mount devices 40, 50 thereby permitting the user to couple the first mount device 40 to the second mount device 50.

Figure 12:
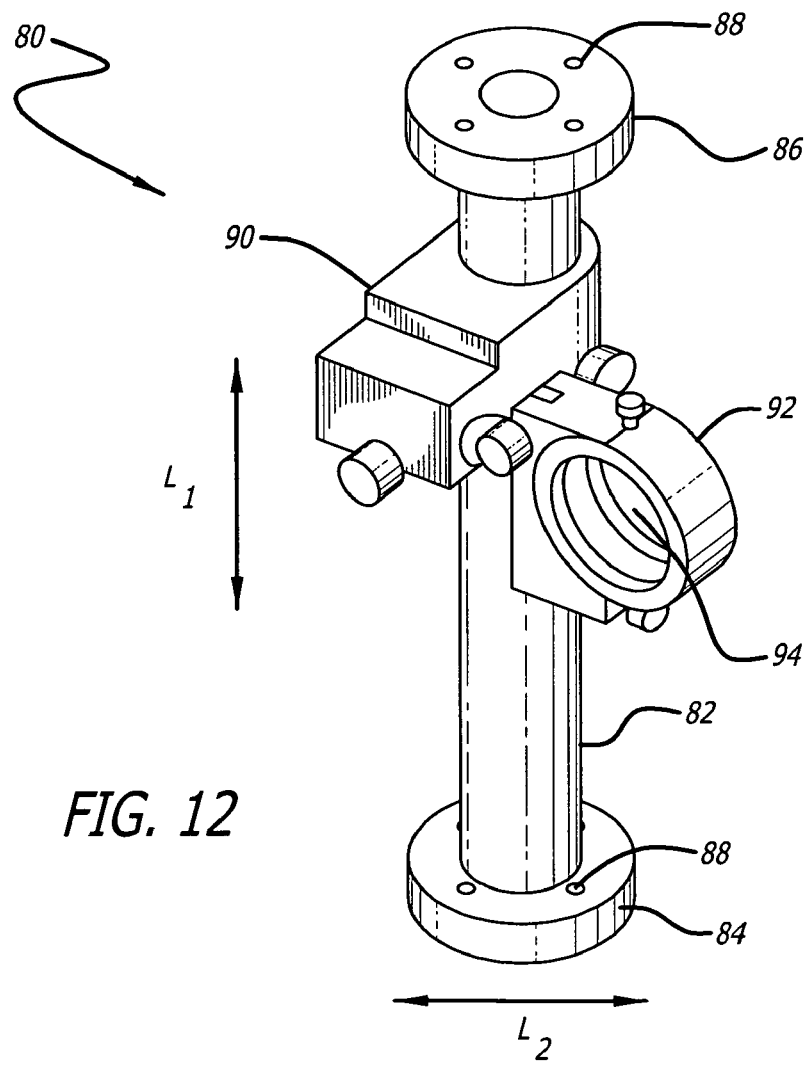
FIG. 12 shows an embodiment of an adjustable optical component mount system for use with an embodiment of a laser beam jitter reduction device.

FIG. 12 shows an alternate embodiment of an optical mount for use with the laser beam jitter reduction device 10. As shown in FIG. 12, the adjustable optical mount 80 includes a mount body 82 positioned between a first mounting flange 84 and a second mounting flange 86. The first and second mounting flanges 84, 86 include at least one fastener orifice 88 formed therein sized to receive one or more fastener devices 46 therethrough, thereby permitting the adjustable optical mount 80 to be coupled to the first and second optical tables 12, 14. One or more adjustable body members 90 may be positioned or otherwise in communication with the mount body 82 and configured to move along the mount body 82 along the line $L_1$. Coupled to the adjustable body member 90 is at least one component support 92 defining a component aperture 94 sized to receive at least one optical component or analytical device 18 therein. Optionally, the component support 92 may be configured to be adjustably connected to the adjustable body member 90 thereby permitting the component support 92 to move along the line $L_2$ laterally in relation to line $L_1$. As such, the adjustable optical mount 80 as illustrated in FIG. 12 permits a user to adjust the position of an optical component coupled thereto along two axis as illustrated by lines $L_1$ and $L_2$.

The present application further discloses a method of reducing jitter on an optical bench. To reduce jitter in an optical system the user secures an optical mount 16 to a first and second optical bench 12, 14. In one embodiment the first and second optical benches 12, 14 are positioned on differing planes $P_{H1}$, $P_{H2}$. (See FIG. 2) The first and second planes $P_{H1}$, $P_{H2}$ may be parallel, intersecting, and/or orthogonal. For example, the user may couple the first mounting flange 84 of the adjustable optical mount 80 as illustrated in FIG. 12 to the first optical bench 12 using one or more fastener devices 46. Thereafter, the user may secure the second mounting flange 86 of the adjustable optical mount 80 to the second optical bench 14 in a similar fashion. As such, the adjustable optical mount 80 is secured to the first and second optical benches 12, 14. Thereafter, an optical component or analytical device 18 may be positioned on or coupled to the adjustable optical mount 80.

In closing, embodiments disclosed herein are illustrative of the principles of the invention. Other modifications may be employed which are within the scope of the invention, thus, by way of example but not of limitation, alternative optical mounts 16, alternative materials, and alternative optical bench alignments. Accordingly, the systems and devices disclosed in the present application are not limited to that precisely as shown and described herein.

What is claimed is:

1. A device, comprising:
   a first optical table positioned on a first plane;
   a second optical table positioned on a second plane, the second plane differing from the first plane, the second plane intersecting the first plane; and
   at least one optical mount coupled to the first and second optical tables and configured to support at least one optical component.

2. The device of claim 1 wherein the first plane is horizontal.

3. The device of claim 1 wherein the second plane is horizontal.

4. The device of claim 1 wherein the first plane is vertical.

5. The device of claim 1 wherein the second plane is vertical.

6. The device of claim 1 wherein the second plane is orthogonal to the first plane.

7. The device of claim 1 wherein at least one of the first and second optical tables comprises a slab of one or more materials.

8. The device of claim 7 wherein at least one of the first and second optical tables comprises a composite construction design having a core material positioned between a first and second surface.

9. The device of claim 1 wherein at least one of the first and second optical tables includes one or more mounting apertures formed on a surface thereof, the one or more mounting apertures configured to receive and retain a portion of the optical mount therein.

10. The device of claim 9 wherein the mounting aperture is threaded to receive and retain the optical component mount therein.

11. The device of claim 1 wherein the at least one of the optical tables includes a surface capable of having the optical mount magnetically affixed thereto.

12. The device of claim 1 wherein the first optical table has a thickness greater than a thickness of the second optical table.

13. The device of claim 1 wherein the first optical table has a thickness approximately equal to a thickness of the second optical table.

14. The device of claim 1 wherein the first optical table has a thickness less than a thickness of the second optical table.

15. A device, comprising:
a first optical table positioned on a first plane and having a first mounting surface positioned thereon;
a second optical table positioned on a second plane differing from the first plane, the first plane being orthogonal to the second plane, the second optical table having a second mounting surface positioned proximate to the first mounting surface of the first optical table; and
at least one optical mount coupled to the first and second mounting surfaces and configured to support at least one optical component thereon.

16. The device of claim 15 wherein the first and second planes are horizontal.

17. The device of claim 15 wherein the first and second planes are vertical.

18. The device of claim 15 wherein the first and second planes are intersecting.

19. The device of claim 15 wherein at least one of the first and second mounting surface further comprises one or more mounting apertures formed thereon.

20. The device of claim 19 wherein the mounting apertures are threaded and configured to engage and retain the optical mount in threaded relation.

21. The device of claim 15 wherein at least one of the first and second mounting surfaces is configured to have the optical mount coupled thereto in magnetic relation.

22. A device comprising:
a first mount device having a first mount body extending from a first base configured to be coupled to a first optical table, the first mount body defining a first optic receiver orifice; and
a second mount device having a second mount body extending from a second base configured to be coupled to a second optical table, the second mount body defining a second optic receiver orifice, the second mount device configured to engage the first mount device to form an optical mount capable of supporting one or more optical components,
wherein at least one of the first and second optical tables comprises a composite construction design having a core material positioned between a first and second surface.

23. The device of claim 22 wherein the first and second mount bases further comprise one or more fastener passages sized to receive a fastener therethrough and configured to couple the first and second mount bases to the first and second optical tables.

24. The device of claim 22 further comprising:
at least a first coupling flange formed on the first mount body;
at least a second coupling flange formed on the second mount body; and
one or more couplers configured to engage the first and second coupling flanges thereby coupling the second mount to the first mount.

25. A device, comprising:
a first mounting flange configured to couple to a first optical table;
a second mounting flange configured to couple to a second optical table;
a mount body positioned between and coupled to the first and second mounting flanges; and
at least one optical component mount movably coupled to the mount body and configured to support at least one optical component thereon, the optical component mount being horizontally and vertically movable in relation to the first and second optical tables.

26. The device of claim 25 wherein the optical component mount is vertically movable in relation to the first and second optical tables.

27. The device of claim 25 wherein the optical component mount is horizontally movable in relation to the first and second optical tables.

28. A method, comprising:
positioning a first optical table on a first plane;
positioning a second optical table on a second plane wherein the second plane differs from the first plane, the second plane being orthogonal to the first plane;
securing a first portion of an optical component mount to a first optical table;
securing a second portion of an optical component mount to a second optical table wherein the first and second portions of the optical mounts form an optical component mount system; and
coupling at least one optical component to the optical component mount system.

29. The method of claim 28 further comprising positioning the second optical table on a second plane parallel to the first plane.

30. The device of claim 1 wherein the component mount is horizontally and vertically movable in relation to the first and second optical tables.

31. The device of claim 15 wherein at least one of the first and second optical tables comprises a composite Construction design having a core material positioned between a first and second optical table surface.

32. The device of claim 25 wherein at least one of the first and second optical tables comprises a composite construction design having a core material positioned between a first and second surface.

33. The method of claim 28 wherein the first plane intersects the second plane.

* * * * *